S. SPRINGER.
WINE FILTER.
APPLICATION FILED AUG. 2, 1913.
1,099,212.
Patented June 9, 1914.
2 SHEETS—SHEET 1.
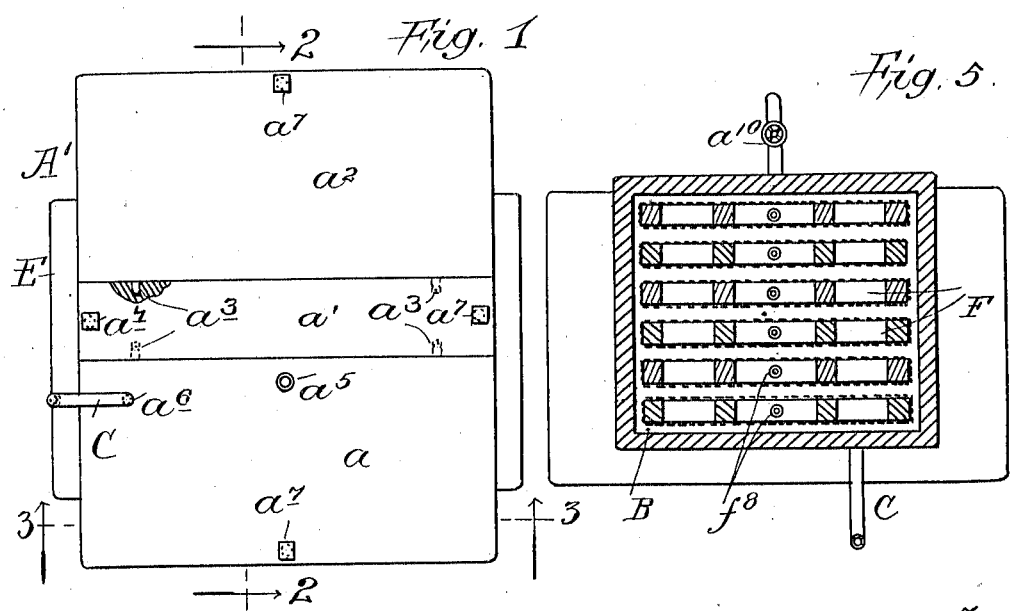
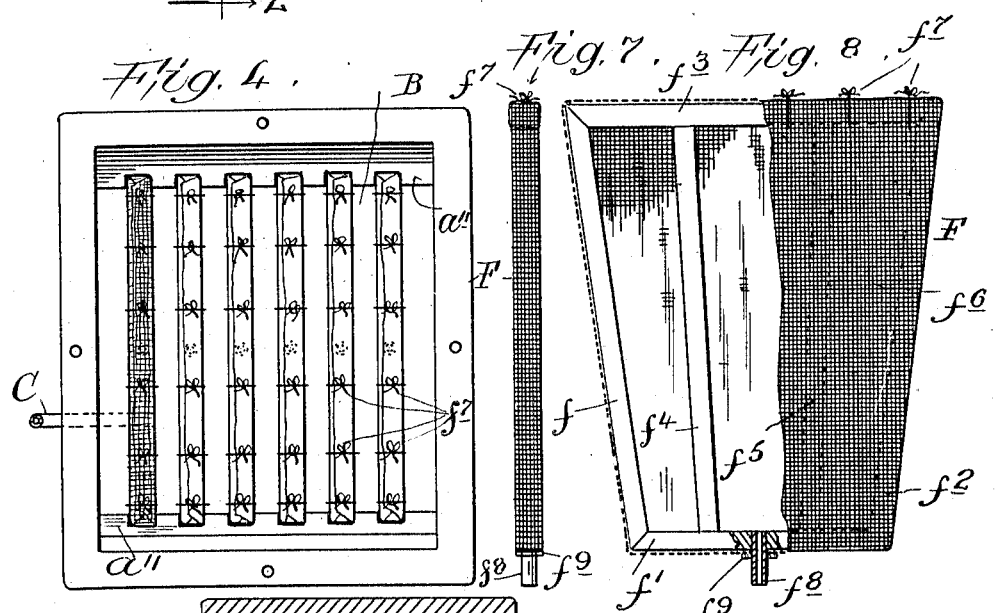
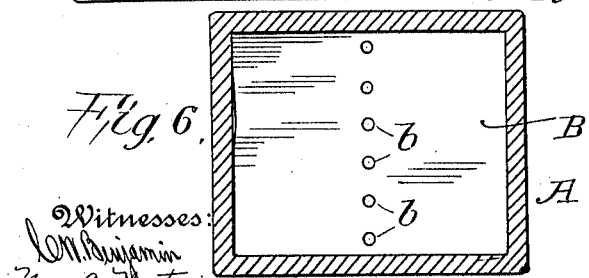
Witnesses:
Inventor
Simon Springer
By his Attorney S. SPRINGER.
WINE FILTER.
APPLICATION FILED AUG. 2, 1913.
1,099,212.
Patented June 9, 1914.
2 SHEETS—SHEET 2.
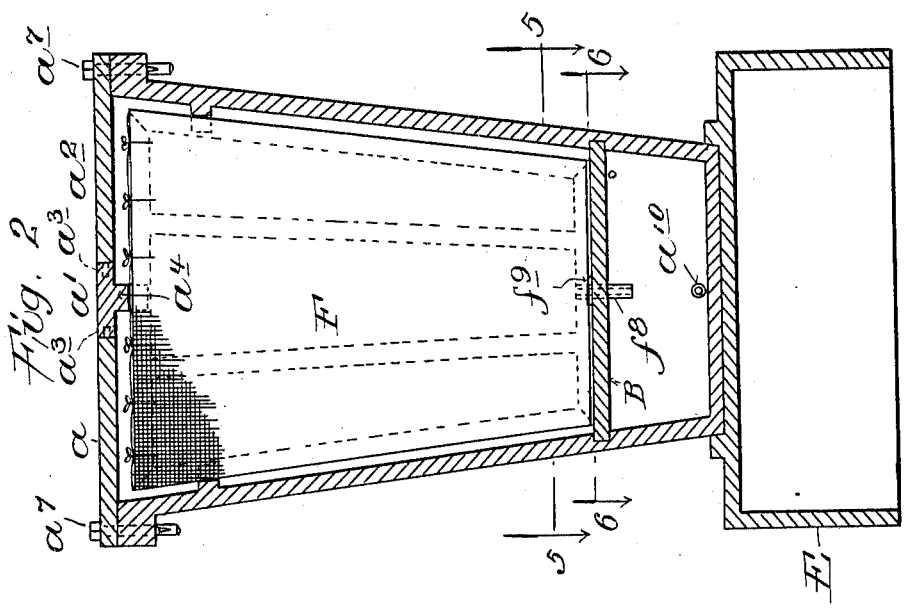
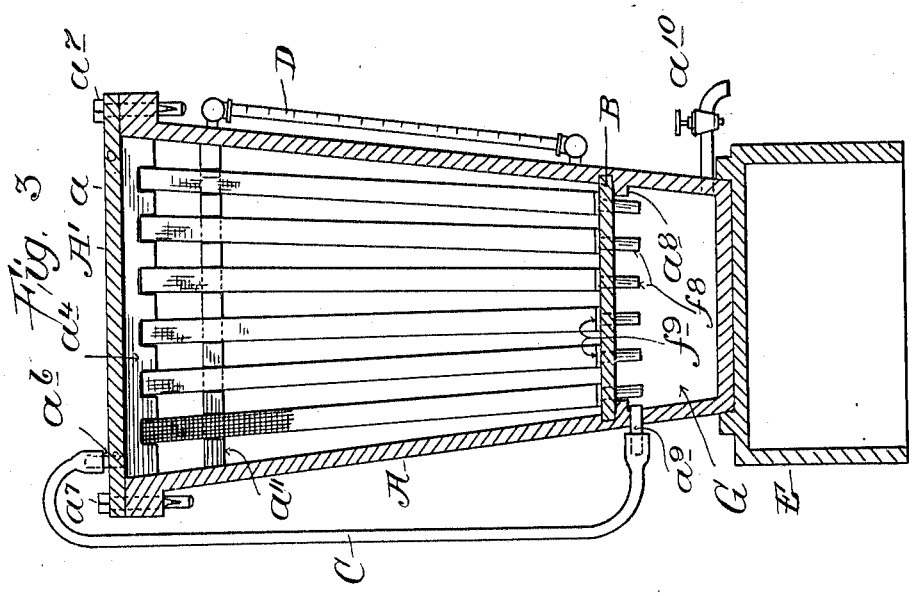
Witnesses:
C. W. Benjamin
Nora A. Norton
Inventor
Simon Springer
By his Attorney
J. W. Bowen.

UNITED STATES PATENT OFFICE.

SIMON SPRINGER, OF NEW YORK, N. Y.

WINE-FILTER.

1,099,212.

Specification of Letters Patent. Patented June 9, 1914.

Application filed August 2, 1913. Serial No. 782,714.

*To all whom it may concern:*

Be it known that I, SIMON SPRINGER, a subject of the King of Roumania, residing in the borough of Manhattan, in the county, city, and State of New York, have invented a certain new and useful Improvement in Wine-Filters, of which the following is a specification.

I will first describe my improvement in detail and then point out the novel features in the claims.

In the accompanying drawings Figure 1 is a plan view of a wine filter embodying my improvement; Fig. 2 is a vertical section taken on the plane of the dotted lines 2—2, Fig. 1; Fig. 3 is a vertical section taken on the plane of the dotted lines 3—3, Fig. 1; Fig. 4 is a plan view of a wine filter embodying my improvement with the cover removed; Fig. 5 is a sectional view taken on the plane of the dotted lines 5—5, Fig. 2; Fig. 6 is a sectional view taken on the plane of the dotted lines 6—6, Fig. 2; Fig. 7 is an edge view of one of the sieves used in my wine filter; and Fig. 8 is a side view, of a wine filter embodying my improvement partially broken away to show a frame covered with gauze or any suitable mesh.

Similar letters of reference designate corresponding parts in all the figures.

A designates a receptacle. As illustrated in the drawings the receptacle A has four sides, and the sides are shown as tapering inwardly from the top downward. The receptacle A is provided with a cover $A^1$ shown as made in three sections $a$, $a^1$, $a^2$, and the section $a^1$ is shown as fastened to the section $a$ and $a^2$ by means of pins $a^3$. On its interior the section $a^1$ is shown as provided with a rack $a^4$. The cover $A^1$ is shown as provided with an intake as $a^5$, and with another opening as $a^6$, and the cover $A^1$ may be fastened to the receptacle A by suitable bolts as $a^7$.

B designates a plate in the interior of the receptacle A. As shown, this plate B is inserted into the sides of the receptacle A and may rest on lugs, as $a^8$ made integral with or secured to the sides of the receptacle A. The plate B is shown as provided with openings $b$. The receptacle A is shown as provided with an opening $a^9$, below the plate B, and a tubing C is shown as extending between the openings $a^6$ and $a^9$. A tube D of glass or other transparent material may be employed to indicate the level of the liquid contained in the receptacle A. The receptacle A is also shown as provided with a faucet $a^{10}$ below the plate B. The receptacle A may rest upon any suitable stand as E.

$a^{11}$ designate racks on opposite sides of the interior of the receptacle A.

F designate frames. These frames are shown as composed of frame work as $f$, $f^1$, $f^2$, $f^3$, $f^4$ and $f^5$, which frame work is shown as covered with any fabric, as $f^6$ suitable for filtering purposes. Cords as $f^7$ may be employed to tie the fabric $f^6$ in place. The frames F are shown as provided with tubes $f^8$, and washers, as $f^9$ are shown as provided at the points where the tubes $f^8$ and fabric $f^6$ meet each other.

When a frame as F is placed in position in the receptacle A, the tube $f^8$ of such frame will pass through one of the openings $b$ and the sides of such frame will be held between the teeth of the racks $a^{11}$. The spaces between the teeth of the rack $a^4$ will also aid in holding such frame F in position, and as the frames F do not engage the sides of the receptacle A except at the points where they are held in position by the racks $a^{11}$ the liquid will be permitted to maintain an even level in the receptacle.

The liquid introduced into the wine filter through the intake $a^5$ passes through the fabric $f^6$ and is thereby filtered. After filtration the liquid passes through one of the tubes $f^8$ into the space G and from said space it may be drawn off through the faucet $a^{10}$. The tubing C will transmit air between the space G and that part of the receptacle A which contains the unfiltered liquid and thereby avoid a vacuum either in the space G or in that part of the receptacle A which contains unfiltered liquid. The tubing D will, of course, enable the attendant to determine whether the unfiltered liquid is above or below any desired level. Any frame F may, of course, be readily and conveniently taken away to enable the fabric thereof to be cleansed or for any other purpose.

The various parts of the wine filter which may come in contact with the liquid will, of course, be made of wood or such other material as will not be injuriously affected by, or injuriously affect, the liquid.

By my improvement I provide means whereby wines may be cheaply and expeditiously filtered and which, at the same time, will permit such filtration without the continued exposure of the liquid to the outer air during the filtering process.

What I claim as my invention and desire to secure by Letters Patent is:

1. A wine filter comprising a filter tank, racks arranged upon opposite sides of the filter tank, a cover for the tank, a rack secured to the cover, the bottom of the tank being provided with a line of openings, a plurality of filter frames adapted to engage the racks and be spaced thereby and drip pipes slidingly engaging the openings in the bottom of the tank rigid with the respective filter frame.

2. A wine filter comprising a filter tank, a cover for the tank, a rack arranged on the under side of the cover, corresponding racks arranged upon opposite sides of the tank and parallel to the rack on the cover, the bottom of said tank having arranged therein openings, filter frames engaging the racks and having the upper ends held in place thereby and a drip pipe depending substantially vertically from each of said filter frames and rigid therewith and slidingly engaging one of the openings in the bottom of the tank, the filter frames adapted for individual removal while the drip pipes position the lower ends of the filter frames.

SIMON SPRINGER.

Witnesses:
JOHN L. BERK,
WM. SCHLEICHER.

---

Copies of this patent may be obtained for five cents each, by addressing the "Commissioner of Patents, Washington, D. C."